March 23, 1965 R. G. SANDERS ET AL 3,174,768
LUGGAGE CART

Filed June 27, 1963 2 Sheets-Sheet 1

INVENTORS
NORMAN B. WATKINS
RALPH G. SANDERS
BY Zulwider, Patton, Rieber,
Lee, and Utecht
ATTORNEYS

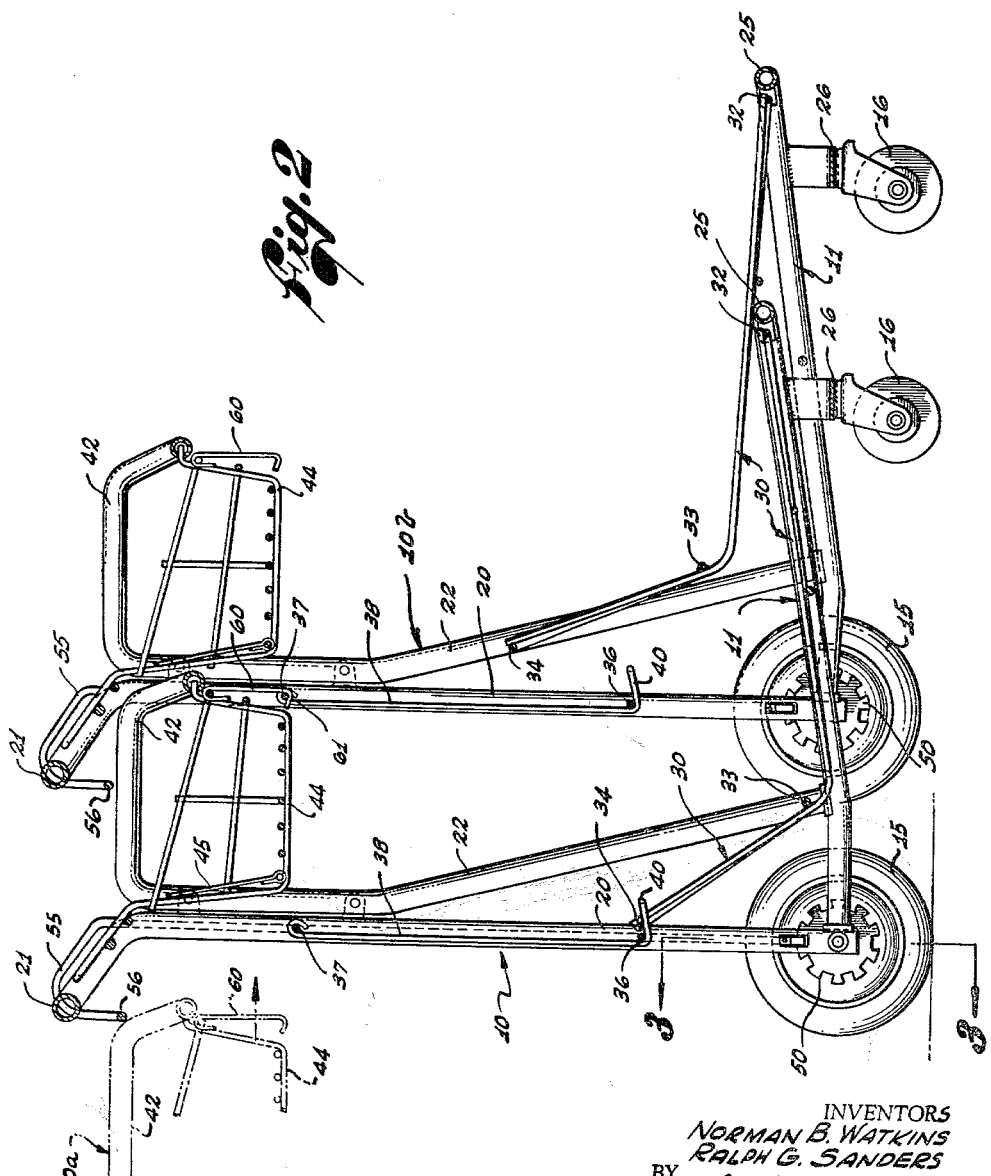

United States Patent Office 3,174,768
Patented Mar. 23, 1965

3,174,768
LUGGAGE CART
Ralph G. Sanders and Norman B. Watkins, Burbank, Calif., assignors to Technibilt Corporation, Glendale, Calif., a corporation of California
Filed June 27, 1963, Ser. No. 291,037
7 Claims. (Cl. 280—33.99)

This invention relates generally to hand trucks or carts and more particularly to such a truck or cart that is specifically designed for the carrying of luggage and similar material in locations such as railroad, bus, airline, and steamship terminals, hotels and motels, etc.

While the problem of carrying luggage from one place to another has always been a problem, the problem has become more acute in recent years as conditions have changed. Thus, where it was formerly quite simple to obtain the services of a porter to help carry luggage to and from the train, fewer people are now willing to act as porters, and it is thus more difficult to secure help in carrying the luggage.

With the advent of the supermarket, people have become accustomed to wheeling shopping carts as they make their purchases in the store. While a shopping cart is not particularly adapted for carrying luggage, people have become accustomed to the idea of selecting a cart from a convenient central location, loading that cart and pushing it to the desired location. Thus, the provision of luggage carts in some central location in a parking area is particularly appealing to a traveller who can then transfer his luggage from his car to such a cart, wheel the cart to the gate or ticket window, and even to the train or other vehicle if he is to take his luggage on board with him. The luggage cart can then be left, as for example, on the station platform, where an arriving passenger may use the cart to transport his luggage to the parking lot, a taxi zone, or other suitable location. All of this can be accomplished without requiring the services of a porter, which services must be paid for, and which are sometimes rendered in something less than the most satisfactory manner.

It is therefore a major object of the present invention to provide a hand cart particularly adapted for the transporting of hand luggage.

Another object of the invention is to provide such a cart of simple but rugged construction whose function will immediately become apparent to a traveller, without having to have any instructions as to its use.

It is another object of the invention to provide such a truck that, in addition to carrying luggage, is also adapted to carry a small child in complete safety, thus rendering travel much easier for parents.

A further object of the invention is to provide such a cart that can easily and quickly be nested with other like carts, much in the manner of the well-known shopping cart.

It is a still further object of the invention to provide an automatic braking system for such carts that will prevent the rolling of the cart unless it is being deliberately guided by a person.

Yet another object of the invention is to provide a luggage cart having the foregoing advantages that is simply and ruggedly built and will withstand the rough usage and abuse to which such carts must be expected to be subjected.

These and other objects and advantages of the invention will become apparent from the following description of a preferred form thereof, and from the drawings illustrating that form in which FIGURE 1 is a perspective view of a luggage cart constructed in accordance with the present invention;

FIGURE 2 is a cross-sectional view of a cart, with the position of nesting carts in front of and in back of the cart indicated;

Figure 1:
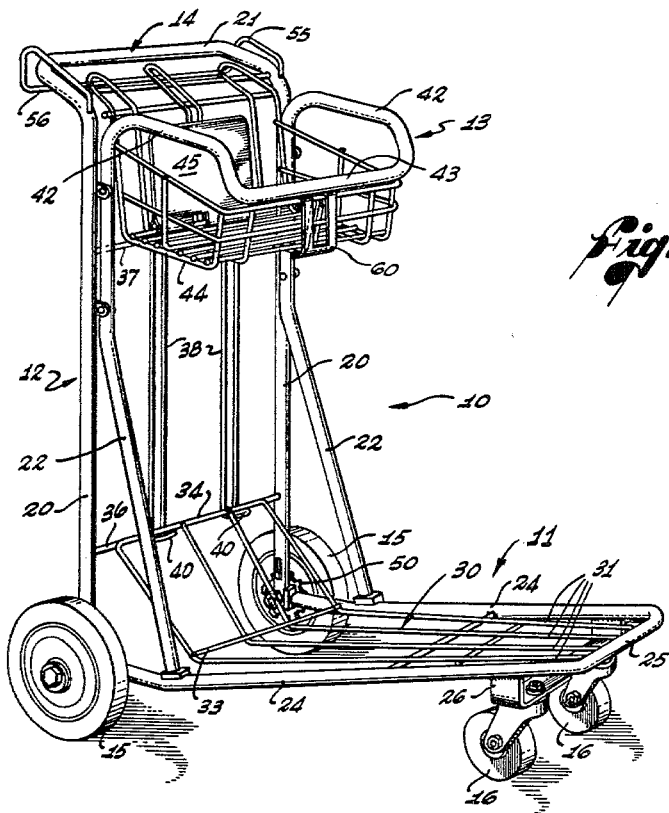

Referring now to the drawings and particularly to FIGURE 1 thereof, the numeral 10 indicates generally a luggage cart having a framework preferably formed of tubular material and comprising a bed portion 11, an upright portion 12, a basket portion 13, and a handle 14. The rear wheels 15 are located at the bottom of the upright portion 12, and casters 16 are located at and support the front end of the bed 11, the wheels and casters being adapted for ease in moving the cart across pavement, flooring etc., hereinafter referred to generally as "pavement." The forward end of the bed 11 is narrower than the rear end, and the upright portion 12 of the frame is aligned with the rear end of the bed 11 so that the front end of the bed may fit in between the sides of the frame in the manner of nesting, telescoping market carts. As will hereinafter become more apparent, this is an important feature of the present invention.

To permit the nesting or telescoping of one cart with another, the rear portion of the bed 11 and the lower portion of the upright portion 12 are kept free of bracing members that extend from one side of the cart to the other. For this reason, the rear wheels 15 are mounted on stub shafts that are attached to the respective side portions of the upright portion 12, and not upon an axle or shaft that extends from one side to the other.

Because of the necessity for strength and rigidity, the upright portion is preferably formed of two tubular sections, one a rear upright 20 that extends upwardly from one wheel 15 and at its upper end is bent rearwardly and then across to the other side of the cart to form a handle 21, then forwardly and down to the other rear wheel 15. A forward tubular upright 22 is attached to the bed 11 at a point forwardly of the wheels 15 and extends upwardly and rearwardly to meet the rear tubular upright 20 at a point slightly below the basket portion 13. The forward tubular upright 22 then extends upwardly along the rear tubular upright 20 to a point slightly below the handle 21, where the forward tubular upright is bent forwardly to form the upper edge of the basket portion 13, then horizontally to the other side of the cart 10 and then rearwardly to the rear tubular upright 20 and then down along that upright and then forwardly to the bed 11.

The bed 11 includes a generally U-shaped frame member 24 extending forwardly from the rear wheels 15 to the forward end of the cart 10, where the frame 24 is bent to form a horizontal front member 25 extending between the right and left sides 24. Preferably, each side 24 extends substantially horizontally from the wheels 15 to the point at which the front upright 22 attaches to it, and the side members 24 then project slightly upwardly as well as forwardly, forming an angle of approximately 90° with the upright 22, so that any luggage resting upon the side members tends to move rearwardly to a position resting against the uprights 22, rather than having a tendency to slide forwardly, off the front end of the cart.

The casters 16 are preferably mounted on a bracket means 26 extending from one side member 24 to the other, the casters swivelling independently for ease in steering. Such construction has been used for many years in the manufacture of market carts and is well known in the art.

While the bed 11 is ruggedly built of tubular material, forming the sides 24 and front 25, and thus able to carry and support large and heavy pieces of luggage, it is also necessary to make provision for carrying some smaller pieces. Consequently, a tray-like member 30 is mounted between the side members 24. As indicated, the tray 30 is preferably formed of rod material and may, for example, consist of a plurality of spaced rods extending from the forward end of the bed 11 to a point substantially aligned with the lower end of the upright 22, the rods then being bent upwardly to meet the rear upright 20 at a point above the wheels 15. The longitudinally extending rods 31 of the tray 30 are connected together at their forward end by a transversely extending rod 32 whose ends may desirably extend into the side members 24 so that the entire tray 30 may pivot about the transverse rod 32. Another transversely extending rod 33 near the bend in the rods 31 joins these longitudinally extending rods together at this point, and other transversely extending rod means 34 connect the rear upper ends of the longitudinally extending rods 31.

Mounted on the upright portion 12 is an open partition formed of a pair of horizontally extending rods that are connected to each other by vertical rods. Thus, a horizontal rod 36 extends from one side member 20 to the other above the rear wheels 15, and a similar rod 37, likewise extending between the side members 20, is located just beneath the basket portion 13. Vertical rods 38 extend downwardly from the upper horizontal rod 37 to the lower horizontal rod 36 and then project forwardly to form hooks 40 on which the rear transverse rod means 34 of the tray 30 normally rests. The vertical rods 38 are firmly connected to the horizontal rods 36 and 37 so that an open partition is formed against which luggage and parcels may rest without danger of falling off the rear end of the truck 10.

It will be appreciated that the horizontal rods 36 and 37 help to brace and strengthen the frame of the hand truck 10 and it will also be appreciated that since the rod 36 is located above the uppermost surface of the forward end 25 of the bed 11, the bed 11 of one cart may be inserted between the sides of the upright portions 12 of another cart. Because of the angular positioning of the longitudinally extending rods 31 between the transverse rods 33 and 34, the tray 30 of the forward cart will be pivoted about its transverse rod 32 by the forward end 25 of the rear cart, as indicated generally in FIGURE 3. The luggage carts 10 can thus nest within each other, much in the manner of grocery carts.

As previously indicated, the basket portion 13 of the luggage cart 10 is formed primarily by the upper ends of the forward uprights 22. At their upper ends, these uprights are bent forwardly to form substantially horizontal projections 42 that extend slightly beyond the junction of the forward upright 22 with the bed 11. At their forward ends, the horizontal projections 42 are bent downwardly and inwardly to form a transversely extending horizontal member 43 that acts as the upper edge of the forward wall of the basket portion 13. A basket 44 formed of rod or heavy wire material is supported within the area bounded by the sides 42 and front member 43, substantially all of the basket being forward of the rear uprights 20. The basket 44 is located at a convenient height to receive smaller articles and may be constructed so as to act as the seat for a small child, much as the so-called "baby-seat" that is provided in market carts. Thus, the upper boundary of the basket portion 13, as defined by the tubular sections 42, will be at a convenient height for an adult, e.g., 36 inches. The bottom of the basket 44 may be 7 or 8 inches below this, so that an ample depth is provided to hold articles securely. This leaves ample space beneath the bottom of the basket to receive luggage.

When the basket portion 13 is to be used as a child's seat, the child will be placed so that he sits upon the bottom of the basket 44, facing rearwardly, with his legs projecting through apertures in the rear wall of the basket. Such a construction is conventional with market carts, and the luggage cart of the present invention may also incorporate a pivoted panel 45 hinged to the lower rear edge of the basket so that when in a horizontal position, the panel provides a solid seat, and when raised to a vertical position, it closes the leg openings in the rear of the basket 44. This construction is likewise well known in market carts.

Since luggage carts usually carry a rather heavy load, and since these carts, both loaded and unloaded may be moved up and down ramps or inclines, and may be left unattended where they may be moved by wind or other phenomena, it is important to provide a self-actuating brake mechanism that holds the cart against movement except when the brake is purposely released. This releasing is an act that must be continued so long as the cart is to be moved, and when the release mechanism is no longer operated, the brake is automatically applied. This provides a control similar to the so-called "dead man control" which in this case is actuated if a cart gets away from the person guiding it down the ramp. Actually the holding means of the present cart is more properly described as a locking means rather than a brake, since the holding means makes use of a toothed wheel into which a pin is moved to prevent rotation of the wheel.

Figure 3:
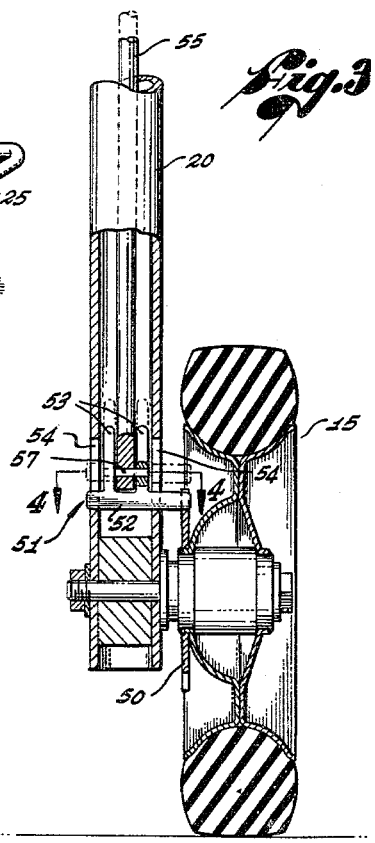
FIGURE 3 is a cross-sectional view taken along the line 3—3 of FIGURE 2 and indicating the construction of the brake mechanism.
Figure 4:
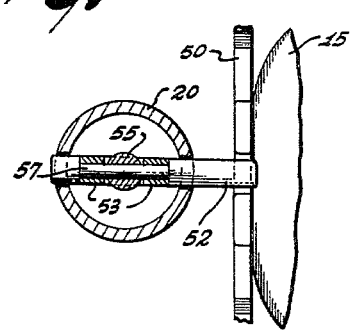
FIGURE 4 is a cross-sectional view taken on the line 4—4 of FIGURE 3 and showing the mounting of the brake lock slide within the tubular frame.

As best seen in FIGURES 3 and 4, one or both of the rear wheels 15 is provided with a toothed or notched disc 50 that is mounted upon the same stub shaft as the wheel 15 and is held rigidly to the wheel for rotation with it. The disc 50 is located on the inside of the wheel 15, adjacent the tubular upright 20, and within the upright is a lock slide 51 consisting of a lock member 52 that extends transversely through the tubular member and projects beyond it a sufficient distance to engage the disc 50. A pair of guide members 53 extend upwardly from the lock member 52 to engage the inner walls of the tubular member 20 and guide the lock slide 51. Slots 54 are cut in the sides of the tubular member 20 to receive the lock member 52, and the lock slide 51 is thus held against rotation within the tubular member and guided in its movement up and down within the slots 54.

A brake release rod 55, substantially coaxial with the tubular member 20 projects upwardly from the lock slide 51 and is attached to the lock slide by a pin or rivet 57 that extends through the guide members 53 and the lower end of the brake release rod 55. The pin or rivet 57 is held in place by any appropriate means, and it will be appreciated that by raising the brake release rod 55, the lock slide is likewise raised, as indicated in FIGURE 4, so that the lock member 52 is removed from the appropriate notch in the disc 50, thereby freeing the wheels 15 for rotation.

Preferably, both the right and left rear wheels 15 are provided with the corresponding discs 50, and the right and left rear tubular members 20 each have a brake release rod 55 extending through them. At the upper ends of the upright tubular portions 20, the brake release rods project upwardly to a point above the rearwardly sloping portion of the handle section 14, and the rods are then bent rearwardly generally parallel to the correspondingly directed tubular portion, but spaced above the latter, and finally, are bent downwardly and inwardly below the handle 21 so that the rods extend parallel to the handle and join to form a single brake release grip 56. Normally, the weight of the brake release member 56, the brake release rods 55, and associated elements move the lock slide 51 downwardly so that the lock members 52 engage the appropriate notches in the discs 50. The rear wheels 15 are thus held against rotation, and the luggage cart 10 is thus prevented from moving.

However, when it is desired to wheel the cart to some different location, the brake release member 56 is moved upwardly, toward the handle 21, and the cart is pushed to a new position. Movement of the brake release member 56 is a simple and natural operation when the handle 21 is grasped, since it is only necessary to place the thumbs under the brake release member and squeeze, the brake release member thus being moved toward the handle 21. As soon as the brake release member 56 is released, the member and the associated brake release rods 55 drop, thus urging and permitting the lock members 52 to drop into corresponding notches in the discs 15. As previously indicated, under these conditions the luggage cart 10 is locked or held against rolling movement.

When a number of carts are nested, it is not necessary that all of them be held against movement. Thus, if four or five carts, for example, are nested, and if they all had their brakes applied, it would be most difficult to separate any but the rearmost cart from the group. However, to provide some stability, it is desirable that at least one cart have its brakes applied. This problem is solved in the present luggage cart by a construction which insures that any cart forward of another nested cart has its brakes released, and the rearmost cart has its brakes applied.

This is accomplished, as indicated in FIGURE 2, by locating the brake release member 56 at a height such that it is engaged and moved upwardly, to released position, by the movement of the tubular projections 42 of the basket portion 13 of a rearwardly located cart. Thus, the cart 10 of FIGURE 2 has its brakes applied, but as a rear cart 10a moves into telescoping position with cart 10, the downwardly turned forward ends of the tubular projections 42 slide under the brake release member 56 of the cart 10 and act as a wedge or inclined plane to raise the brake release member and release the brakes. As soon as the person moving the cart 10a into telescoping relationship with cart 10 releases the corresponding brake release member 56 of the cart 10a, the brakes of that cart will be applied and it will be held against movement. The brakes of cart 10 will be released, and if it is desired to move both carts, this can easily be done by releasing the brakes of cart 10a and pushing the two carts as a unit. It is also a simple matter to separate cart 10 from cart 10a by standing at one side of cart 10 and grasping the brake release member 56 and retaining it in its upper position while pushing against the tubular handle 21. It is thus a simple matter to separate the carts when this is done purposely, but if some other phenomenon should separate them, such as wind, vibration, their being located on a slight grade, etc. as soon as cart 10 moves away from cart 10a, the brakes of cart 10 are immediately applied and further movement is prevented.

It will be recognized that it is often necessary to move a considerable number of carts from one area to another, and this is most conveniently done by nesting the carts and then pushing on the rear cart. However, this occasionally introduces problems, since if the carts are not carefully handled, they may tend to become separated from each other, and thus have their brakes applied, requiring the renesting and re-release of the brakes of all the carts. Furthermore, it is often difficult to steer a group of ten or twelve carts when each of the carts has casters in front and non-castering wheels in the rear. These problems are solved by the locking bracket provided for the present carts.

As best indicated in FIGURES 1 and 2 a locking bracket 60 is pivotally suspended from the upper edge of the basket 44 in the center thereof, the bracket being essentially U-shaped, with the upper ends of the legs being bent around the uppermost rod of the basket 44. The bracket 60 hangs downwardly, on the outside of the basket 44; and at its lower end, the base of the U is bent rearwardly and slightly upwardly to form a hook-like portion 61 adapted to receive and hold the horizontal rod 37 of another cart. The location and positioning of the rods 37 and the lower ends of the brackets 60 are such that when the horizontal rod 37 of a forward cart 10b is engaged by the hook 61 of a rearward cart 10 the rear wheels 15 of the cart 10b are lifted from the pavement and the rear end of the forward cart 10b is held by the bracket 60.

To engage the rod 37 of the cart 10b upon the hook 61 of the locking bracket 60 of the cart 10, it is necessary to nest the carts together, so that the brake of the forward cart 10b is released, and the bracket 60 of the rear cart 10 is then cammed or swung forwardly by the upward movement of the rod 37 as it is lifted against the lower, angularly positioned surface of the hook 61. When the forward cart 10b has been lifted sufficiently, the locking bracket 60 then clears the rod 37 and swings rearwardly, whereupon the forward cart is lowered so that its horizontal rod 37 is engaged by the hook 61 of the rear cart 10.

The carts 10 and 10b are thus held together in nesting and what may be termed locked position, with the rear wheels 15 of the forward cart 10b being raised above the pavement. The forward casters 16 of the forward cart 10b as well as the forward casters 16 and rear wheels 15 of the rear cart 10 are on the pavement, and additional carts may be so nested and locked until a group of any suitable number has been so collected. The line of carts thus formed may then be moved by pushing on the rearmost cart, with the brake of that cart, of course, released. Since the rear wheels 15 of only the rearmost cart touch the pavement, the only other supporting wheels are the casters 16 of the corresponding carts, and it is thus possible to steer the line of cart quite easily as they are pushed.

The line of carts may be separated at any desired point or an individual cart removed, by raising the rear end of the cart where separation is to occur and swinging forward the locking bracket 60 of the next rearward cart. With the locking bracket thus disengaged, the lifted cart is then lowered, and it, and all others forward of it, may be moved forwardly from the remainder of the carts.

The luggage cart of the present invention has been found to be of great use and benefit in a number of places, such as railroad stations, etc., where luggage must be moved a considerable distance, as from a parking lot to a train. The use of the carts is very simple, and the rearwardly sloping bed 11 provides a convenient and safe support for heavy articles, such as suitcases, and even small trunks. The rearward slope of the bed 11 aids greatly in keeping the articles of luggage firmly on the bed even when going down ramps, or when a sudden stop of the hand cart occurs. If a horizontal or forwardly sloping bed were used, there would be much more tendency for the articles of luggage to slide off, and this is particularly likely to occur when such trucks are largely used by people not especially skilled in the art of stacking luggage on hand carts. The rear wheels 15 and casters 16 are preferably provided with anti-friction bearings, such as ball or roller bearings, so that the physical effort required to move a cart is reduced to a minimum. This feature, coupled with the fact that each cart is provided with a brake to prevent forward movement, provides an ease of operation and assurance of safety that induces many people to use the cart who would otherwise feel a certain reluctance.

In addition to the ease of loading and operating a single cart, the advantages of nesting the carts become apparent when space requirements are noted, and the convenience of joining or locking the carts together for movement as a group is a further advantage.

From the foregoing, it will be seen that there has been provided a simple, strong, and sturdy luggage cart having many features of convenience in use and fully capable of achieving the objects and securing the advantages heretofore set forth. While a preferred form of the device has been disclosed, the invention is not to be limited to the particular form or arrangement of parts herein described and shown, except as limited by the following claims.

We claim:
1. A cart of the class described which includes:
bed means for receiving and transporting packages, said bed means including a tapering frame and a pivoted tray normally parallel to said frame, said frame and said tray being higher at the forward end of said bed means and sloping downwardly toward the rear end of said bed means;
wheel means supporting said bed means for generally horizontal movement, said wheel means including casters at the front of said bed means and wheels having a fixed direction at the rear of said bed means;
upright means mounted on the rear of said bed means and having a handle portion for moving said bed means;
brake means normally holding at least one of said rear wheels against rotation, said brake means having a brake release member adjacent said handle portion for releasing said brake means;
basket means supported by said upright means adjacent said handle portion; and
locking means including a pendant bracket pivotally attached to said basket means and an engaging member attached to said upright means, said bracket and said engaging member being so positioned with respect to each other that the engaging member of a forward cart may be engaged by the bracket of a nested adjacent rear cart to hold said carts together and with the rear end of said forward cart clearing the pavement.

2. A cart as described in claim 1 in which said basket means is provided with leg openings in its rear wall whereby said basket means may be used as a baby seat.

3. A cart as described in claim 1 in which said basket means is provided with leg openings in its rear wall, and has a pivoted member adapted to be moved from a position on the bottom of said basket means to a position covering said leg openings, whereby said basket means may be selectively used for carrying small packages or small children.

4. A cart of the class described which includes:
bed means for receiving and transporting packages, said bed means including a tapering frame and a pivoted tray normally parallel to said frame, said frame and said tray being higher at the forward end of said bed means and sloping downwardly toward the rear end of said bed means;
wheel means supporting said bed means for generally horizontal movement, said wheel means including casters at the front of said bed means and wheels having a fixed direction at the rear of said bed means;
upright means mounted on the rear of said bed means and having a handle portion for moving and directing said bed means, the forward portion of said upright means being approximately perpendicular to the rearwardly sloping portion of said bed means;
brake means normally holding at least one of said rear wheels against rotation, said brake means having a brake release member adjacent said handle portion for releasing said brake means;
basket means supported by said upright means adjacent said handle portion, said basket means having leg openings in its rear wall, and having a pivoted member adapted to be moved from a position on the bottom of said basket means to a position covering said leg openings, whereby said basket means may selectively be used for carrying small packages or small children; and
locking means including a pendant bracket pivotally attached to said basket means and an engaging member attached to said upright means, said bracket and said engaging member being so positioned with respect to each other that the engaging member of a forward cart may be engaged by the bracket of a nested adjacent rear cart to hold said carts together and with the rear end of said forward cart clearing the pavement.

5. A cart of the class described which includes:
bed means for receiving and transporting packages, said bed means including a tapering frame and a pivoted tray whereby the bed means of one cart may be nested within the bed means of another cart, said bed means being higher at its forward end than at its rearward end, whereby said packages tend to move toward said rearward end rather than said forward end;
forward and rearward wheel means supporting said bed means, said forward wheel means being casters and said rear wheel means having a fixed direction;
upright means mounted on the rear of said bed means and having a handle portion for moving said bed means, said upright means acting to prevent rearward movement of said packages off said bed means;
brake means normally holding at least one of said rear wheels against rotation, said brake means having a brake release member adjacent said handle portion for releasing said brake means;
basket means supported by said upright means adjacent said handle portion, said basket means having leg openings in its rear wall, and having a pivoted member adapted to be moved from a position on the bottom of said basket means to a position covering said leg openings, whereby said basket means may selectively be used for carrying small packages or small children, said basket means extending over only the rear portion of said bed means, leaving the forward portion of said bed means unobstructed for carrying tall loads of said packages, said basket means being so co-ordinated in height with said brake release member that in the nesting of carts, the brake of each forward cart is released by the basket of the cart just behind it;
an engaging member attached to the upper portion of said upright means; and
a swingable bracket attached to said basket means and located at the front thereof to support an engaging member of a forward cart, said bracket being so positioned with respect to said engaging member that in the nesting of carts, when the engaging member of each forward cart is supported by the bracket of the cart just behind it, the rearward wheel means of said forward cart are raised clear of the supporting surface.

6. A cart of the class described which includes:
bed means for receiving and transporting packages, said bed means including a tapering frame and a pivoted tray whereby the bed means of one cart may be nested within the bed means of another cart, said bed means being higher at its forward end than at its rearward end, whereby said packages tend to move toward said rearward end rather than said forward end;
forward and rearward wheel means supporting said bed means, said forward wheel means being casters and said rear wheel means having a fixed direction;
upright means mounted on the rear of said bed means and having a handle portion for moving said bed means, said upright means acting to prevent rearward movement of said packages off said bed means;
brake means normally holding at least one of said rear wheels against rotation, said brake means having a brake release member adjacent said handle portion for releasing said brake means; and
basket means supported by said upright means adjacent said handle portion, said basket means having leg openings in its rear wall, and having a pivoted member adapted to be moved from a position on the bottom of said basket means to a position covering said leg openings, whereby said basket means may selectively be used for carrying small packages or small children, said basket means extending over only the rear portion of said bed means, leaving the forward portion of said bed means unobstructed for carrying tall loads of said packages, said basket means being so co-ordinated in height with said brake release member that in the nesting of carts, the brake of each forward cart is released by the basket of the cart just behind it.

7. A cart of the class described which includes:

bed means for receiving and transporting packages, said bed means including a tapering frame and a pivoted tray whereby the bed means of one cart may be nested within the bed means of another cart, said bed means being higher at its forward end than at its rearward end, whereby said packages tend to move toward said rearward end rather than said forward end;

forward and rearward wheel means supporting said bed means, said forward wheel means being casters and said rear wheel means having a fixed direction;

upright means mounted on the rear of said bed means and having a handle portion for moving said bed means, said upright means acting to prevent rearward movement of said packages off said bed means;

basket means supported by said upright means adjacent said handle portion, said basket means having leg openings in its rear wall, and having a pivoted member adapted to be moved from a position on the bottom of said basket means to a position covering said leg openings, whereby said basket means may selectively be used for carrying small packages or small children, said basket means extending over only the rear portion of said bed means, leaving the forward portion of said bed means unobstructed for carrying tall loads of said packages;

an engaging member attached to the upper portion of said upright means; and a swingable bracket attached to said basket means and located at the front thereof to support an engaging member of a forward cart, said bracket being so positioned with respect to said engaging member that in the nesting of carts, when the engaging member of each forward cart is supported by the bracket of the cart just behind it, the rearward wheel means of said forward cart are raised clear of the supporting surface.

References Cited by the Examiner

UNITED STATES PATENTS

| 1,861,958 | 6/32 | Gallinant | 188—20 |
| 2,583,513 | 1/52 | Maslow | 280—33.99 |
| 2,764,419 | 9/56 | Enders | 280—33.99 |
| 2,818,267 | 12/57 | Watson | 280—33.99 |
| 2,882,062 | 4/59 | Hoedinghaus et al. | 280—33.99 |
| 2,889,151 | 6/59 | Sides | 280—33.99 |
| 2,958,537 | 11/60 | Young | 280—33.99 |
| 2,970,845 | 2/61 | Thompson | 280—33.99 |
| 3,015,494 | 1/62 | Fosbrook | 280—33.99 |

FOREIGN PATENTS 1,194,860   5/59   France.

PHILIP ARNOLD, *Primary Examiner.*

A. HARRY LEVY, *Examiner.*